UNITED STATES PATENT OFFICE.

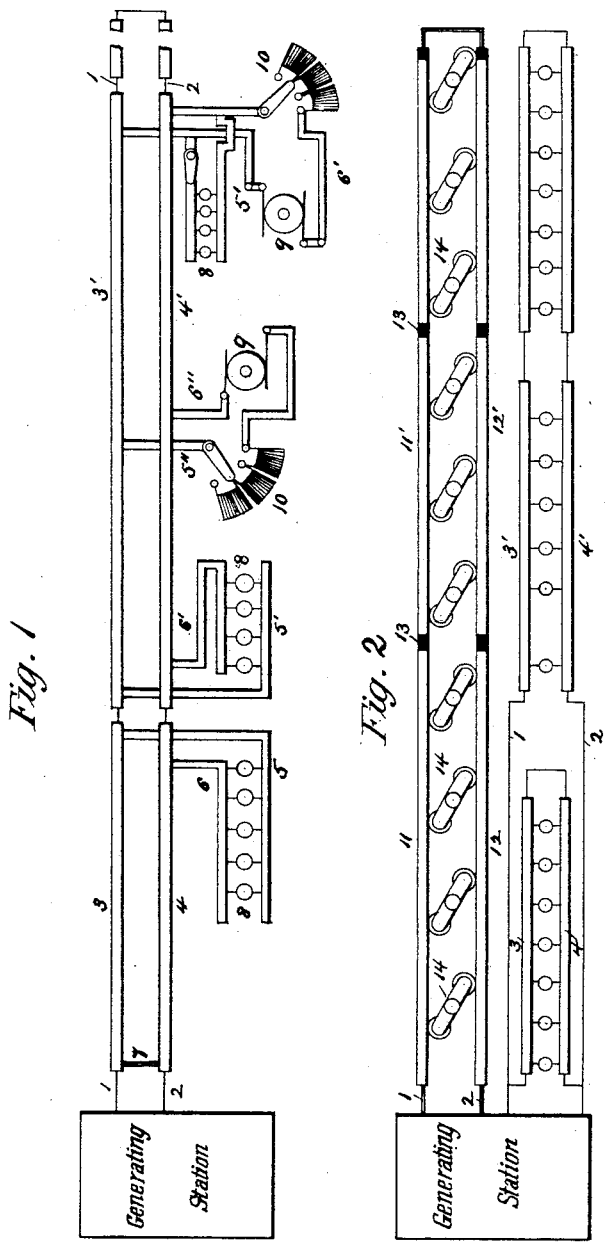

ELIAS E. RIES, OF BALTIMORE, MARYLAND, ASSIGNOR TO RIES & HENDERSON.

SYSTEM OF LINEAR TRANSFORMERS.

SPECIFICATION forming part of Letters Patent No. 402,971, dated May 7, 1889.

Original application filed August 31, 1887, Serial No. 248,405. Divided and this application filed February 11, 1889. Serial No. 299,474. (No model.)

*To all whom it may concern:*

Be it known that I, ELIAS E. RIES, a citizen of the United States, residing at Baltimore, in the State of Maryland, have invented a certain new and useful Improvement in Systems of Linear Transformers, of which the following is a specification.

My invention has reference to electrical systems of conversion and distribution, and its object is to obviate the objectionable features inherent in systems of this character now in use.

A common feature in these old systems of distribution and conversion was a line-circuit carrying intermittent or alternating currents of high tension and small quantity and local circuits derived at various points from the line including the high-resistance coils of converters or inductoriums of the Ruhmkorff type, the low-resistance coils of which were connected with the working-circuits. In these low-resistance coils currents of lower tension and greater quantity than those upon the line were induced, and these currents were utilized for the operation of translating devices, as lamps, motors, &c. It will be understood that in such systems the resistance of the line-conductors is what may be called a "dead resistance"—that is to say, no work is done by the current during its passage from the generator to the point of conversion. Moreover, the exposed condition of the insulation of the line-conductors was a source of expense and danger.

Owing to the dangerously high tension of the line-currents special provisions must be made in these old systems for connecting the line-conductors with the inductoriums, so that these connections could be made and broken without danger to the operator. Specially-constructed insulators, switches, &c., had to be made, and these special constructions were both expensive and unreliable and were rapidly destroyed by the excessive sparking which occurs whenever the circuit is broken. Furthermore, in the old system each inductorium is located at a predetermined point in the line, and if current is wanted at intermediate points it has to be carried to the same by heavy conductors from the nearest converter, or a new inductorium or converter has to be established at that point. In my novel system of distribution and conversion these objectionable features are avoided by the use of what I call "linear" or "cable" converters, fully described and claimed in an application for Letters Patent, Serial No. 248,405, filed by me August 31, 1887, and of which this is a division. I do not, however, confine myself in my present system to the identical construction of linear converters shown in said application, and no claim is herein made for any special construction of such linear converter; but by the use of such converters all dead resistance is avoided in my system of distribution. No part of the high-tension circuit is or need be exposed, and I can supply a current to any point along the line of my system, which may be used for the operation of electric lamps, stationary motors, or for electric propulsion of vehicles. All this will more fully appear from the following detailed description, in which reference is made to the accompanying drawings, and in which I have shown in—

Figure 1 a diagram of a system of conversion and distribution embodying my invention, and in Fig. 2 a similar system adapted to the propulsion of vehicles by electricity and for electric lighting.

Referring now more particularly to Fig. 1, there is a round metallic circuit composed of the direct and return conductors 1 2, which extend from the generating-station to the farthest point where the energy consumed at the generating-station is to be utilized. The conductors of this circuit must be well insulated, and preferably, but not necessarily, by two separate layers of insulating material, as set forth in my original application, No. 248,405. These conductors are charged with intermittent or alternating currents of high tension and small quantity, and they form the primary circuit of my linear converter. Parallel and in close proximity to these primary wires are the secondary conductors 3 4 3' 4', &c. They are by preference made in the form of sleeves or tubes, completely surrounding the primaries, as set forth in my original application above referred to; but they may also be of different construction, so long as they extend parallel and in inductive proximity to the primary conductors.

In using my system, as will hereinafter more fully appear, the primary conductors are never manipulated; their circuit, being once established, remains closed. As shown in the drawings, the secondary conductors are made in disconnected sections; but they may also be made continuous, in which case they will extend as one integral mass from the generating-station to the farthest point of the line, and from there back again to the generating-station. If made in sections, as shown, each section will be of such length as is required for generating currents of the requisite tension for operating the translating devices which it is intended to use upon such circuit.

It is well known that, other things being equal, the potential of a current generated by induction in a conductor is proportional to the length of such conductor, and by making use of this rule I am enabled to construct each section of secondary conductors of such length as is best adapted to the particular translating devices employed in such section.

Each section of secondary conductors is tapped by one or more working-circuits, 5 6 5′ 6′, &c., and if only one such working-circuit is derived from that section, the latter is permanently bridged at one end by a cross-connection, 7. If one or more working-circuits are permanently closed, then the separate cross-connection 7 is dispensed with.

In the working-circuits, which are preferably multiple-arc branches derived from the secondary conductors, are included the translating devices, which may be of any kind, as electric lamps 8 or electric motors 9, and these working-circuits will or may be provided with current-regulators 10, and they will be otherwise equipped in a manner well understood by those skilled in the art.

The operation of this system will now be readily understood.

The intermittent or alternating high-tension currents passing through the primary conductors generate alternating currents of lower potential, and, if desired, of greater quantity in the secondary conductors, so that each section of secondary conductors, together with the corresponding portion of the primary circuit, constitutes a converter, which furnishes current of the requisite potential to the working-circuits, by which the secondary conductors are tapped at the desired points. In the section of converter marked by the numerals 3′ 4′ is shown at one end a derived circuit bridging the two conductors, and including electric lamps in multiple arc, while at the other end this section is tapped by another working-circuit, including an electric motor, this working-circuit in turn being tapped by a branch for working electric lamps. If it is now desired to work the electric motor 9 or other translating device at any intermediate point between the two ends of the transformer-sections 3′ 4′, all that is necessary is to tap the secondary conductors at that point by working-conductors 5″ 6″, as shown. It is therefore not necessary for this purpose either to establish a new converter at this point or to carry the current to the same through a long distance from the nearest converter by heavy working-conductors, since the current induced in the secondary conductor will distribute itself among the translating devices in circuit according to the well-known law of electrical distribution. In thus establishing a new translating-station the dangerous high-tension circuit is not manipulated at all.

My system of conversion and distribution is equally applicable to the working of electric railways. This is shown in Fig. 2, where the secondary conductors 11 12 11′ 12′ are either the traffic or the contact rails of an electric railway. The sections are insulated from each other, as indicated at 13, and by preference the rails are constructed to completely envelop the primary conductors in accordance with the invention set forth in the original application, of which this is a division, and since the currents in the rails are of low potential they only require ordinary insulation, and the handling of these rails is not accompanied by any danger. If the conducting-rails 11 12 are also the traffic-rails of the railway, the circuit from the same is completed to the electric motors on the motor-car by the driving-wheels; but if the rails 11 12 are merely conducting-rails, such as are ordinarily placed in a conduit or channel between the traffic-rails, or carried overhead on suitable posts, the current to the traveling motor is supplied by separate contact wheels or trucks 14 14, as is well understood by those skilled in the art.

The same generators which supply current to the railway may be used for supplying current to a similar system of conversion and distribution for electric lighting or other purposes, as indicated in Fig. 2.

Having now fully described my invention, I claim as new and desire to secure by Letters Patent—

1. A system of electrical distribution and conversion, consisting of line-conductors extending from the generating-station to the farthest point of consumption, charged by intermittent or alternating currents of high tension; one or more sections of conductors parallel and in inductive proximity to the line-conductors, and one or more working-circuits bridging said conductors at any desired point or points, substantially as described.

2. In a system of electrical distribution and conversion, the combination of a round metallic primary circuit extending from a generating-station to the farthest point of consumption, charged by intermittent or alternating currents of high tension, with a secondary circuit or circuits composed of conductors extending along each branch of the primary circuit, insulated therefrom and covering and protecting the same, and one or more working-circuits bridging the secondary conductors, and translating devices therein, substantially as described.

3. In a system of electrical distribution and conversion, a primary circuit charged with high-tension currents and extending from the generating-station to the farthest point of consumption, with one or more sections of secondary conductors in inductive relation with the primary circuit and proportionate in length to the potential required in the secondary circuit, and one or more working-circuits bridging each section of secondary conductors, and translating devices therein, substantially as described.

4. In a system of electric railways, a round metallic line of parallel conductors extending along the road and charged with intermittent or alternating currents of high tension, with conducting-rails insulated from and covering the line-conductors, and contact wheels or trucks for bridging the rails and conveying current to the traveling electric motor, substantially as described.

5. A system of electrical distribution and conversion, comprising a generator of alternating or intermittent currents, primary line-conductors extending from said generator to one or more distant points of consumption, one or more secondary line-conductors parallel with and in inductive proximity to the primary line-conductor and arranged to be inductively charged therefrom with currents of a different tension, and translating devices fed by the current or currents so induced in the secondary conductors, substantially as described.

6. A system of electrical distribution and conversion, comprising a primary line of conductors extending from a generating-station to distant points of consumption and charged with intermittent or alternating currents of a given tension, secondary line-conductors parallel with and in inductive proximity to the primary line-conductors, and consumption-circuits tapping the secondary conductors at any point or points on the line, substantially as described.

In testimony whereof I have signed my name to this specification in the presence of two subscribing witnesses.

ELIAS E. RIES.

Witnesses:
L. A. WRAY,
E. H. PILSBURY.